Dec. 8, 1931.  H. E. WARREN  1,835,918
SYNCHRONOUS MOTOR AND STARTING DEVICE
Filed Feb. 13, 1931

Inventor:
Henry E. Warren,
by Charles E. Tullar
His Attorney

Patented Dec. 8, 1931

1,835,918

UNITED STATES PATENT OFFICE

HENRY E. WARREN, OF ASHLAND, MASSACHUSETTS, ASSIGNOR TO WARREN TELE-
CHRON COMPANY, OF ASHLAND, MASSACHUSETTS, A CORPORATION OF MAINE

SYNCHRONOUS MOTOR AND STARTING DEVICE

Application filed February 13, 1931. Serial No. 515,582.

My invention relates to non-self-starting synchronous motors and to means for starting and synchronizing the same. The invention is particularly applicable to small motors such as those for driving timing devices and I will describe my invention as applied to a motor for driving a clock.

In most applications of a small synchronous motor for driving timing devices it is preferable to have the motor self-starting, but in particular applications and in some clock systems where the source of supply is subject to failure or interruption for appreciable durations of time a synchronous motor of the non-self-starting type is occasionally called for. One of the difficulties met with in the use of a non-self-starting synchronous motor is getting it into synchronism after starting by hand. Various starting devices for non-self-starting synchronous motors are available. Some of these are rather complicated and make use of a fly-wheel effect which remains in operation and is driven by the motor after its starting function has been performed. Such devices are generally not very satisfactory and occasion bearing wear and bearing troubles which shorten the useful life of the drive with which they are associated. I employ a fly-wheel starting device connected to the rotor through a one way driving connection such that the fly-wheel is in operation only during the starting operation. It may therefore be correctly proportioned for this one purpose without making any compromise provisions for continuous operation. Moreover, it is far more effective than a continuously connected fly-wheel for reasons which will be explained.

Figure 1:
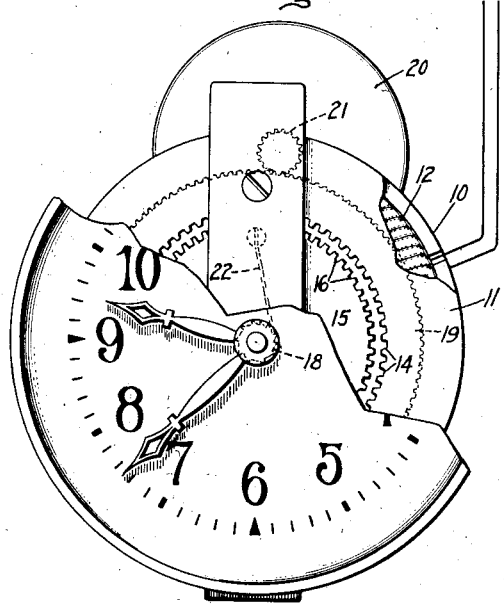
Figure 2:
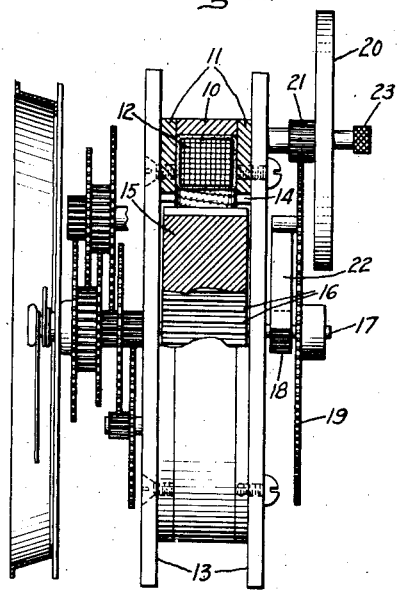
Figure 3:
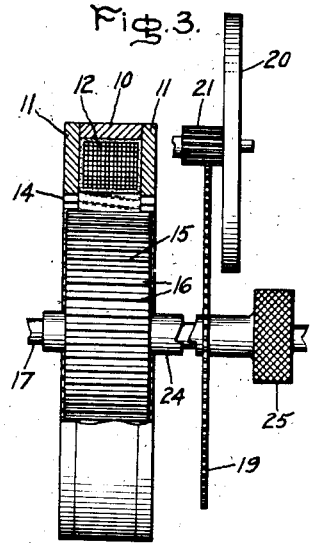
Figure 4:
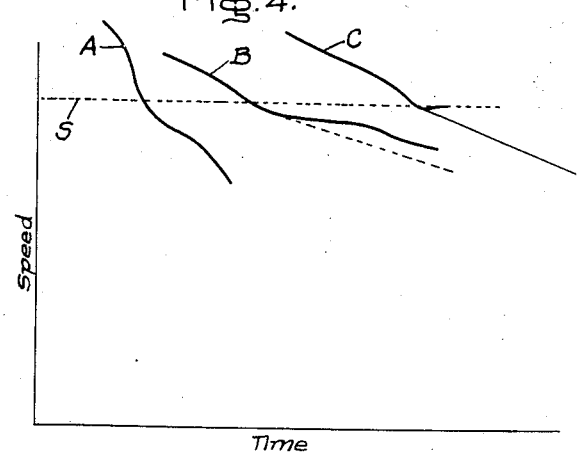

The features of my invention which are believed to be novel and patentable will be pointed out in the claims appended hereto. For a better understanding of my invention reference is made in the following description to the accompanying drawings, Figs. 1 and 2 of which show partial front and side views respectively of a clock equipped with my non-self-starting synchronous motor and its starting device. Fig. 3 illustrates a slight modification of the starting device as applied to the motor; and Fig. 4 represents retardation curves which will be referred to in explaining the operation of my starting device.

I will first explain the construction and operation of the non-self-starting synchronous motor. The clock gear train and clock mechanism driven by the motor are substantially similar to prior art arrangements and require no explanation. The field element of the motor is stationary and comprises an annular or circular magnetic structure of U-shaped cross-section, the open part of the U being on the inside. Within the U section of this structure is an annular shaped exciting coil. As illustrated, the magnetic field structure is made up of an outer tube or shell part 10 with two similar washer shaped side pieces 11. The exciting coil is laid and embraced within the limb portions of the U as shown at 12. This construction allows the coil to be form-wound before assembly. The three sections of the magnetic material comprising the field core are secured together in any convenient manner. As illustrated in Fig. 2, they are secured between plates 13 which also support the rotor bearings at their centers. The inner open edges of the field plates 11 have a large number of salient poles 14 cut therein and resemble internal cut gears. Both plates have the same number of teeth and the teeth are spaced opposite each other. These teeth preferably extend inwardly slightly beyond the inner periphery of the exciting coil.

The rotor 15 comprises a magnetic wheel with salient poles 16 cut in its periphery and resembles a gear wheel. This wheel is mounted within and concentric with the stator field. The magnetic parts of stator and rotor are preferably made of steel. The rotor teeth are spaced a small distance from the stator teeth and magnetically bridge the space between the two stator plates 11 and thus one rotor tooth cooperates with stator teeth in the two groups. The magnetic circuit of the motor is around the coil 12 through the U-shaped field, across the periphery of the rotor and crosses two air gaps at each side between the stator and rotor teeth. The entire inner and outer adjacent peripheral surfaces of stator and rotor are thus utilized at all times. The synchronous speed of such a motor depends upon the number of stator and rotor teeth. The number of teeth in the rotor may be the same as in the stator field or some multiple or sub-multiple thereof. If the stator and rotor have 50 teeth each the synchronous speed will be such that the rotor makes 1/50 revolution per half cycle, or 1/25 revolution per cycle. On a 60 cycle circuit this would be 144 revolutions per minute. If the stator and rotor have 60 teeth each the synchronous speed will be 120 R. P. M. on 60 cycles, etc. In any case the synchronous speed will be such that the rotor seeks a succession of positions of minimum reluctance in synchronism with the alternating flux pulsations from the stator teeth. The motor may be inverted so that the field is inside and the proportions may be changed to suit requirements.

The synchronous torque is quite powerful but the motor has no starting torque whatever, in fact, it has a stand-still locking torque equivalent to the torque at synchronous speed. The motor must therefore be started and brought to the vicinity of synchronous speed with the rotor teeth opposite the stator teeth at approximately the time the flux pulsations are a maximum in order for the motor to fall into step. In other words, the synchronizing operation involves two factors; first, the rotor must be operating at, or approximately at, synchronous speed; and second, the rotor and stator teeth must be approximately opposite each other in phase with the flux pulsations. When these two conditions are sufficiently correct that the synchronous torque tending to establish synchronism is greater than the inertia forces resisting the synchronous torque the rotor will lock into step.

The rotor is mounted on a shaft 17 having bearings in the supporting plates 13. One end of this shaft goes to the clock gear train and the other end of the shaft is used to start the motor by the device now to be described.

In Fig. 2 a small ratchet-wheel 18 is secured to the motor shaft. A gear wheel 19 free to turn on shaft 17 is geared to a fly-wheel 20 through gear 21. A light spring pawl 22 is secured to the inner side of gear 19 and its free end rests lightly against the periphery of ratchet-wheel 18 such that if the fly-wheel 20 is given a spin by the thumb piece 23 in a clockwise direction, as viewed from the right of Fig. 2, pawl 22 will engage with a tooth in ratchet-wheel 18 and accelerate the rotor of the motor and the parts connected thereto. The spin of the fly-wheel must be sufficient to bring the parts up to and generally above the synchronous operating speed. The parts then begin to slow down. Owing to the inertia of the spinning fly-wheel which is rotating considerably faster than any other part it tends to slow down at a less rapid rate than the remaining parts. However, owing to the ratchet connection 18—22 the motor rotor cannot slow down at a faster rate than that of the fly-wheel. As a result the parts approach the synchronous operating speed at a sufficiently slow rate of retardation that, with the motor energized, the conditions necessary for synchronism are established. The synchronous torque of the motor then pulls the rotor into synchronous speed and holds it at such speed. As soon as this happens the fly-wheel gears 21 and 19 and pawl 22 are disconnected from driving relation with the rotor. This is because the fly-wheel keeps on slowing down and the ratchet wheel 18 moves faster than the pawl in a direction which permits the pawl to ride over the ratchet teeth. Thus, although the fly-wheel governs the retardation rate of the rotor, at the instant synchronism is established the inertia effect of the fly-wheel ceases to have any influence. The fly-wheel comes to rest and remains at rest until it is needed again to start the motor.

The starting arrangement shown in Fig. 3 is similar to that of Fig. 2 except for the ratchet wheel and pawl. In Fig. 3 one or more axial ratchet teeth are cut in the hub 24 of the rotor and a corresponding tooth projects from the hub of gear wheel 19. Wheel 19 is free to rotate and to slide endwise on shaft 17. To start the rotor the motor is energized. Thumb-piece 25 is grasped and wheel 19 shoved toward the rotor so that the ratchet parts engage and the rotating parts are given a spin thereby accelerating the rotor and fly-wheel 20 in the manner previously described. As soon as synchronism is established and hub 24 rotates faster than gear wheel 19 the ratchet connection disengages itself.

The advantages of a fly-wheel of high inertia and the advantages of removing its influence upon the establishment of synchronism will be more fully understood by reference to Fig. 4. In this figure the abscissa represents time and the ordinates represent speed. The horizontal dotted line S represents the synchronous speed of the device and curves A, B and C represent retardation curves for different forms of devices.

Curve A is drawn to represent the retardation curve of the rotor and connected parts of a motor of the type in question where these parts do not have a fly-wheel or equivalent inertia. The parts therefore slow down at a relatively rapid rate through the synchronous speed range. The speed favorable for establishing synchronism is of such short duration that the chances of the flux-teeth phase relation being favorable during such short period are not very good and the chances are that several trials will be necessary before synchronism is established. The curve indicates that the synchronous torque exerted itself but was not sufficient when the rotor was at a favorable speed to pull it into synchronism.

Curve B represents the retardation curve of a mechanism having a continuously connected fly-wheel, or its equivalent. The rate of retardation is slower and the time during which the speed is favorable for establishing synchronism is increased. Synchronism cannot be established however until the parts are down to synchronism. If the phase relation is favorable when the parts get slightly below synchronous speed the synchronous torque will be required to accelerate the high inertia rotating parts. Thus, while there is a greater length of time available for establishing a correct phase relation in the vicinity of synchronous speed the speed limits are more exacting because of the greater inertia effect to be overcome by the synchronous torque, and again the chances are that more than one, and possibly several, trials will be required before the motor is synchronized. The dotted line below curve B indicates the normal retardation rate of the parts after being slowed down by the synchronous torque acting while the parts were above synchronous speed. When the parts got below synchronous speed the synchronous torque slowed up the retardation rate but was insufficient in comparison to the inertia to establish synchronism.

Curve C illustrates the conditions existing with my invention. The normal retardation rate is slow because of the high inertia fly-wheel and therefore the time favorable for establishing synchronism is ample. In fact, the fly-wheel inertia may be made as great as desired and the retardation rate made much slower than represented. It is made sufficient so that between the time the rotor is at synchronous speed and before it gets down beyond the synchronous pull in range several flux pulsations and a favorable flux-tooth phase relation will have occurred. The synchronous torque thus established does not need to overcome the inertia effect of the fly-wheel since as explained above the fly-wheel is automatically disconnected from the rotor as soon as the synchronous torque picks up the rotor. The heavy portion of curve C which dips below and back to the synchronous speed line S represents the rotor as it pulls into synchronism. The light straight portion which continues downward represents the retardation of the disconnected fly-wheel.

I have demonstrated that the device as built substantially as proportioned in the drawing is 100% efficient and never fails to establish synchronism if the rotor is launched at or above its synchronous speed. Because it is used only for starting we have no heavy parts rotating continuously at high speed and expensive bearings and bearing troubles are largely eliminated. On the other hand, I may make the fly-wheel weight, or speed, or both, as great as I choose to obtain the desired starting characteristics without compromising these factors by considerations necessary to take into account if designed for continuous operation.

The particular design of synchronous motor represented is particularly suited for clocks because of its flat circular shape and compact, inexpensive, rugged construction. All continuously rotating parts are of relatively slow speed so that elaborate lubrication precautions and expensive bearings are not needed. Such a motor is quiet in operation and may be used for other purposes such for example as the driving of phonographs. The starting device described is generally applicable to all non-self-starting synchronous motors having characteristics similar to the motor described.

In acordance with the provisions of the patent statutes I have described the principle of operation of my invention, together with the apparatus which I now consider to represent the best embodiment thereof, but I desire to have it understood that such modifications thereof as come within the true spirit and scope of my invention are intended to be covered by the appended claims.

What I claim as new and desire to secure by Letters Patent of the United States is:

1. A non-self-starting alternating current synchronous motor having a rotor, a fly-wheel starting device therefor rotatably connected to the rotor of said motor through a connection such that the fly-wheel may drive the rotor only in one direction and cannot be driven by the rotor in the same direction, said fly-wheel having a speed and weight such that its inertia effect at the speed corresponding to the synchronous speed of the motor is materially greater than the inertia effect of the motor rotor at such speed, whereby the fly-wheel may be spun in the aforesaid direction to bring the rotor to above its synchronous speed and then force the rotor to have a retardation rate through its synchronous speed which is governed by the inertia effect of the fly-wheel and which is sufficiently slow to permit the rotor to lock into step, and whereby when such locking action takes place the inertia effect of the fly-wheel ceases to influence the rotor.

2. In combination with an alternating current source of supply, a motor of the non-self-starting synchronous type having a rotor without sufficient inertia effect in the vicinity of its synchronous speed to prevent its being pulled into synchronism, a fly-wheel starting device for said rotor rotatably connected thereto through a connection such that the fly-wheel can drive the rotor in only one direction and cannot be driven in the same direction by the rotor, said fly-wheel having a materially greater inertia effect than that of the rotor at a speed corresponding to the synchronous speed of the rotor, such that when the parts are rotating in the aforesaid direction and slowing down in the vicinity of the synchronous speed the retardation rate of the rotor is governed by the fly-wheel and is such that it is within its synchronous pull in speed range for several alternations of the alternating current supply, whereby the rotor pulls into step and the fly-wheel continues to slow down without further influencing the rotor.

3. A synchronous motor of the non-self-starting type having stator and rotor elements, an inertia starting device therefor comprising a fly-wheel rotatably connected to the rotor through a connection such that the fly-wheel may drive the rotor in its normal direction of rotation and cannot be driven by the rotor in the same direction, whereby after said device has been employed to start the motor it comes to rest without interfering with the synchronous operation of the motor.

4. A synchronous motor of the non-self-starting type having stator and rotor elements, an inertia starting device therefor comprising a fly-wheel geared to operate at a higher speed than the rotor and connected thereto through a ratchet connection which permits the fly-wheel to drive the rotor in one direction only and which prevents the rotor from driving the fly-wheel in the same direction.

5. A synchronous motor of the non-self-starting type, having stator and rotor elements, a fly-wheel inertia starting device for the rotor connected thereto through a one-way driving connection such that the inertia device comes to rest after a starting operation without interfering with synchronous operation of the rotor, said inertia device having a greater inertia effect and a lesser retardation rate than that of the rotor at speeds corresponding to the synchronous speed of the rotor.

In witness whereof, I have hereunto set my hand.

HENRY E. WARREN.